United States Patent [19]

Mundy

[11] Patent Number: 5,420,999
[45] Date of Patent: May 30, 1995

[54] FREE MEMORY CELL MANAGEMENT

[75] Inventor: Paul Mundy, Hants, United Kingdom

[73] Assignee: International Business Machines Corporation, Armonk, N.Y.

[21] Appl. No.: 969,707

[22] Filed: Oct. 29, 1992

[30] Foreign Application Priority Data

Mar. 27, 1992 [GB] United Kingdom ............... 9206769

[51] Int. Cl.[6] ................................ G06F 12/00
[52] U.S. Cl. .................... 395/425; 395/400; 364/DIG. 1
[58] Field of Search ................... 395/425, 400

[56] References Cited

U.S. PATENT DOCUMENTS 4,967,353 10/1990 Brenner et al. .................. 395/425

OTHER PUBLICATIONS

IBM Technical Disclosure Bulletin–vol. 16, No. 6 Nov. 1973, New York U.S. pp. 1999–2004 "Dynamic Quickcell"–B. R. Aiken et al.
IBM Technical Disclosure Bulletin–vol. 33, No. 8, Jan. 1991, New York U.S. pp. 474–479 "Linked List Search Table Array for Free Storage Blocks".

*Primary Examiner*—David L. Robertson
*Assistant Examiner*—Sheela Nadig
*Attorney, Agent, or Firm*—JoAnn Kealy Crockatt; Peter L. Michaelson

[57] ABSTRACT

A computer data storage management system for allocating and releasing data storage memory in response to requests from application programs. The data storage is organized as a plurality of subpools, each subpool containing a control area 21 and a plurality of pages of memory 122, 222, 322 divided into fixed length cells. Free memory cells contain, within the area used for data storage in non-free cells, an indication 182, 183, 382–384. The presence of this indication is checked prior to the allocation of cells and the absence of the indicator prior to release of the cells.

6 Claims, 6 Drawing Sheets

AREA USABLE FOR DATA STORAGE

FREE MEMORY CELL MANAGEMENT

FIELD OF THE INVENTION

The invention relates to data processing and more specifically to managing allocation and release of fixed length free memory cells within pages of memory.

BACKGROUND OF THE INVENTION

A storage management system manages the allocation prior to use, and release after use, of storage in response to requests from multiple applications running in the same processor. When an application requires some storage to be allocated for its use, it issues a GETMAIN request to the storage management system. The GETMAIN request from the application includes information about the length of storage required. The storage manager responds by informing the application of the address in memory of the storage it has been allocated. When the application no longer requires the allocated storage, it returns it to the storage management system by issuing a FREEMAIN request. The FREEMAIN request from the application includes information about the address in memory of the storage to be released.

Prior art systems use many different algorithms to prevent fragmentation of storage controlled by the system. Requests from an application for storage can be either requests for a fixed length of storage or requests for a variable length of storage. If the requests are for a fixed length of storage then it is relatively simple to use programming techniques which make efficient use of storage.

IBM Technical Disclosure Bulletin "Dynamic Quickcell", November 1973, pp 1999-2004 describes such a programming technique for managing requests for allocation and release of fixed length cells of storage made upon a main storage pool.

In such a system, a pool of storage is divided into generally fixed length cells, known as 'quickcells'. Each free quickcell includes a pointer to the next free quickcell in the pool of quickcells. Initially, each quickcell points to the next adjacent one in physical memory address order. After a number of quickcells have been allocated and released the chain of pointers will become unordered in terms of memory addresses. This does not result in any inefficiency when only main storage is employed but when virtual storage is used, inefficiency may result because pointers may point to quickcells in secondary storage.

To overcome this, quickcells may be organized into a continuous page (for example 4096 bytes (4 k)) called a 'quickcell page'. Each page of quickcells will always either all be in memory or all be paged out onto mass storage. The pointer from each free cell to the next free cell must always be contained within the same page. A number of these quickcell pages are normally arranged together in subpools of storage. A further chain of pointers is created which points from each page having free quickcells to the next such page.

Three common problems arise with the implementation of quickcell pages. These are:
(a) A storage overwrite, where an application writes beyond its allocated storage, which corrupts the pointer in the next free cell in a quickcell page.
(b) A "double freemain" (an attempt to freemain storage which has already been released) within a quickcell subpool, which can result in an infinite loop in the chain of free cells or in a cell being allocated to two different applications.
(c) An "invalid address" provided provided by an application in a freemain request for a quickcell subpool, which can result in storage belonging to another application being released.

DISCLOSURE OF THE INVENTION

The disadvantages of the prior art are overcome, according to the invention, by providing a computer data storage management system for allocating and releasing data storage memory in response to requests from application programs comprising a data storage memory organized as a plurality of subpools, each subpool including a control area, and a plurality of pages and each page including a plurality of fixed length data storage cells; means for creating a system of pointers including a first chain of pointers linking pages having available (free or released) cells; and within each page, a second chain of pointers linking available cells within said page, said second chain of pointers being stored as part of said cell data storage areas; means for writing in each free or released cell an indication that said cell is available; means responsive to a request for allocation of storage to identify an available storage cell via said first and second pointer chains and to return the address of said available storage cell to the requesting application program, said means being further effective to check for the presence of said indication prior to allocation of a cell.

In a preferred embodiment the system further includes means responsive to a request to release a storage cell by modifying said pointer chains to include the released cell, said means checking for the absence of said indication prior to the release of said cell. By the inclusion of an indicator in each cell, errors associated with the allocation of storage from, and release of storage to, storage subpools containing pages of cells can be discovered promptly. When a cell is allocated the indicator is overwritten.

Also in a preferred embodiment, the indicator identifies the subpool in which the cell is included, the means for receiving requests receives the identity of the subpool and the indicator is verified against the subpool identity prior to the release of the cell.

The invention also provides a method of allocating and releasing data storage memory in response to requests from application programs comprising the steps of building a structure in data storage memory comprising a plurality of subpools, each of the subpools being arranged into a control area and a plurality of pages and each page being arranged into a plurality of fixed length data storage cells; providing a first chain of pointers linking pages having available cells and within each page, a second chain of pointers linking available cells within the page, the second chain of pointers being provided within the part of the cell used for data storage; providing an indication in each available cell that the cell is available responding to a request for allocation of storage by identifying a free storage cell via the first and second pointer chains and returning the address of the available storage cell to the requesting application program, the identification including checking for the presence of the indication prior to allocation of a cell.

A preferred embodiment of the method further includes the steps of responding to a request to release a storage cell by modifying the pointer chains to include the released cell and checking for the absence of the indication prior to the release of the cell.

BRIEF DESCRIPTION OF THE DRAWINGS

An embodiment of the invention will now be described, by way of example, with reference to the accompanying drawings, in which.

DETAILED DESCRIPTION OF THE INVENTION

Figure 1:
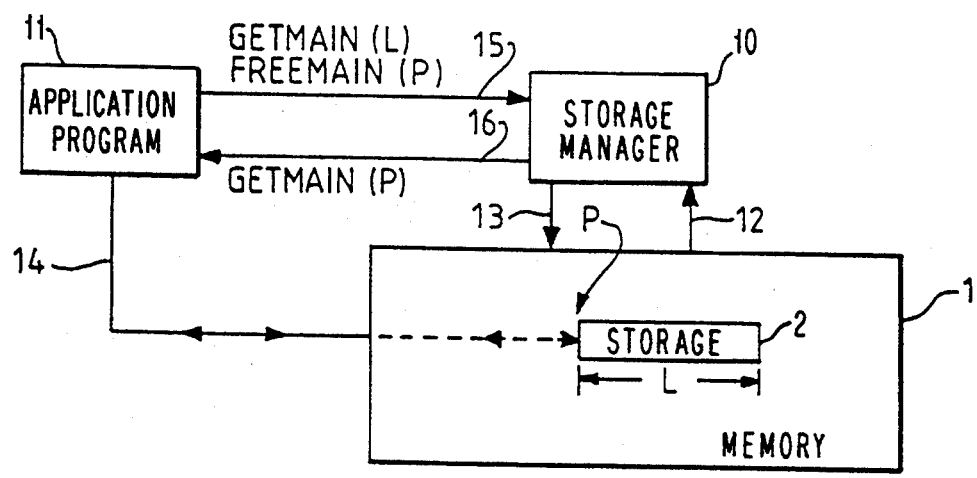
FIG. 1 is a diagram of a data storage memory, a storage management system and an application.

FIG. 1 shows the general principle of allocation of a quantity 2 of storage by a storage management system within an area of main memory 1 in response to a GETMAIN request from an application 11 which includes the length L of storage required. The storage manager 10 interrogates 13 the memory 1, receives 12 the response from the memory and responds to the application by informing the application of the address P of the storage 2 it has been allocated. When the application 11 no longer requires the storage, it returns it to the storage manager 10 by issuing a FREEMAIN request and including the address P of the storage to be released.

Figure 2:
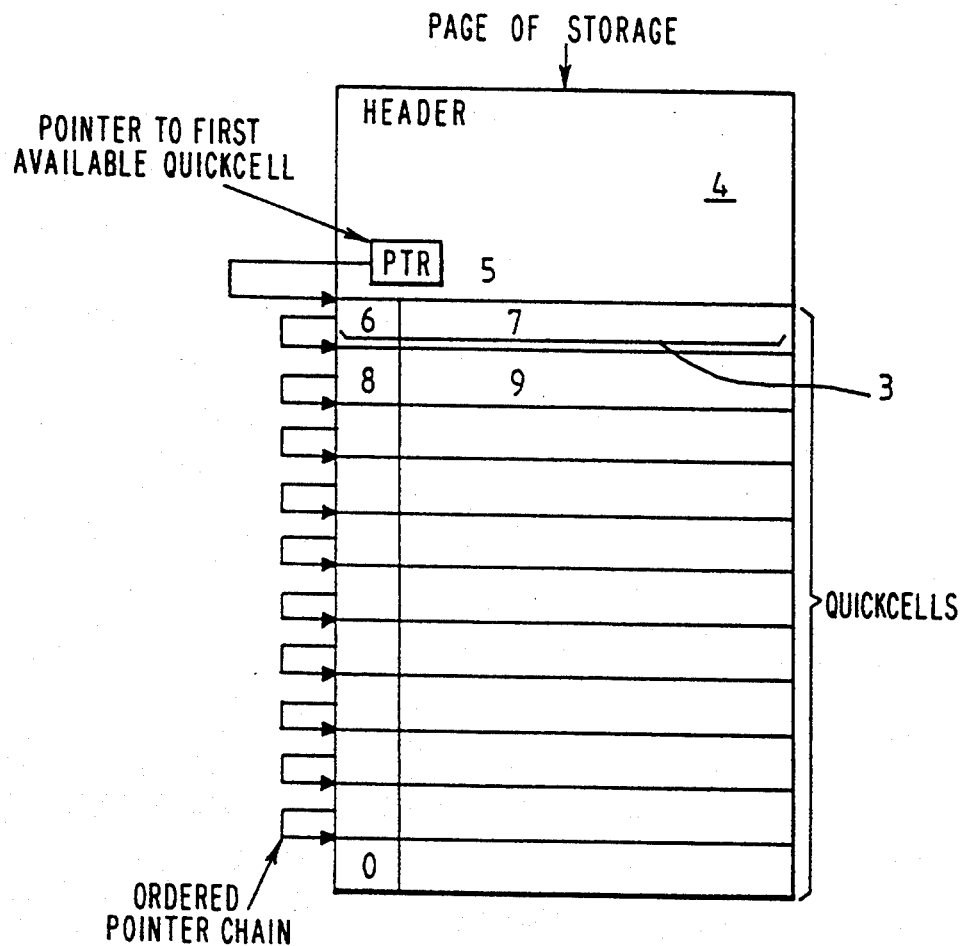
FIG. 2 is a diagram of a page of storage within the data storage memory divided into a header and some fixed length quickcells.

Requests for storage of fixed length, may be handled by the arrangement of FIG. 2. An application issues an ADD_SUBPOOL request to initialise a subpool within main storage. The ADD_SUBPOOL request contains information about the length of storage required and the number of pages to be allocated to the subpool. A large block of storage is pre-formatted into pages containing a header area 4 and fixed length (typically 256 byte) quickcells 3. A Subpool Control Area (SCA) containing pointer chains (described later) is also created. The unallocated storage consists of quickcells comprising pointers, for example 6 and 8, and areas useable for data storage, for example 7 and 9. When the storage is allocated the pointer area 6 is combined with area 7, the whole quickcell area 3 then being used for data storage. The pointer 5 is thus overwritten. An additional pointer 5 from the Header area 4 points to the first free quickcell. The pointer 6 in the first free quickcell points to the next quickcell and so on until the last free quickcell has been reached. The pointer in the last quickcell contains 0.

When an application requires some storage it makes a GETMAIN request including in the request the information listed in table 1. When the storage management system receives a GETMAIN request it allocates the quickcell 7 pointed to by the pointer 5 and copies the contents of the pointer 6, which points to the next free quickcell 9, into the pointer 5. The next GETMAIN request will be allocated the quickcell 9. The storage which contained the pointer 6 will now be used by the application as part of its allocated storage. This is repeated until there are no more quickcells available for allocation, when the pointer 5 is reset to contain 0.

Table 1—GETMAIN request contents

Only entries relevant to the present invention are specified below although the request also contains a number of other entries.

IN (15)—from the application 11 to the storage manager 10

GET_LENGTH Length L of storage requested (optional)

OUT (16)—from the storage manager 10 to the application 11

ADDRESS Address P of storage allocated

When an application no longer requires a quantity of storage it issues a FREEMAIN request including in the request the information listed in table 2. When the storage management system receives a FREEMAIN request the pointer 5, from the header, which points to the current first free quickcell, is copied into the pointer of the quickcell being released. The pointer 5 from the header 4 is then changed to point to the quickcell being released. Thus the chain of free quickcells is maintained with the most recently released quickcells being at the top.

Table 2—FREEMAIN request contents

Only entries relevant to the present invention are specified below although the request also contains a number of other entries.

IN (15)—from the application 11 to the storage manager 10

ADDRESS Address P of storage to be released

OUT (16)—from the storage manager 10 to the application 11

No parameters returned.

Figure 3:
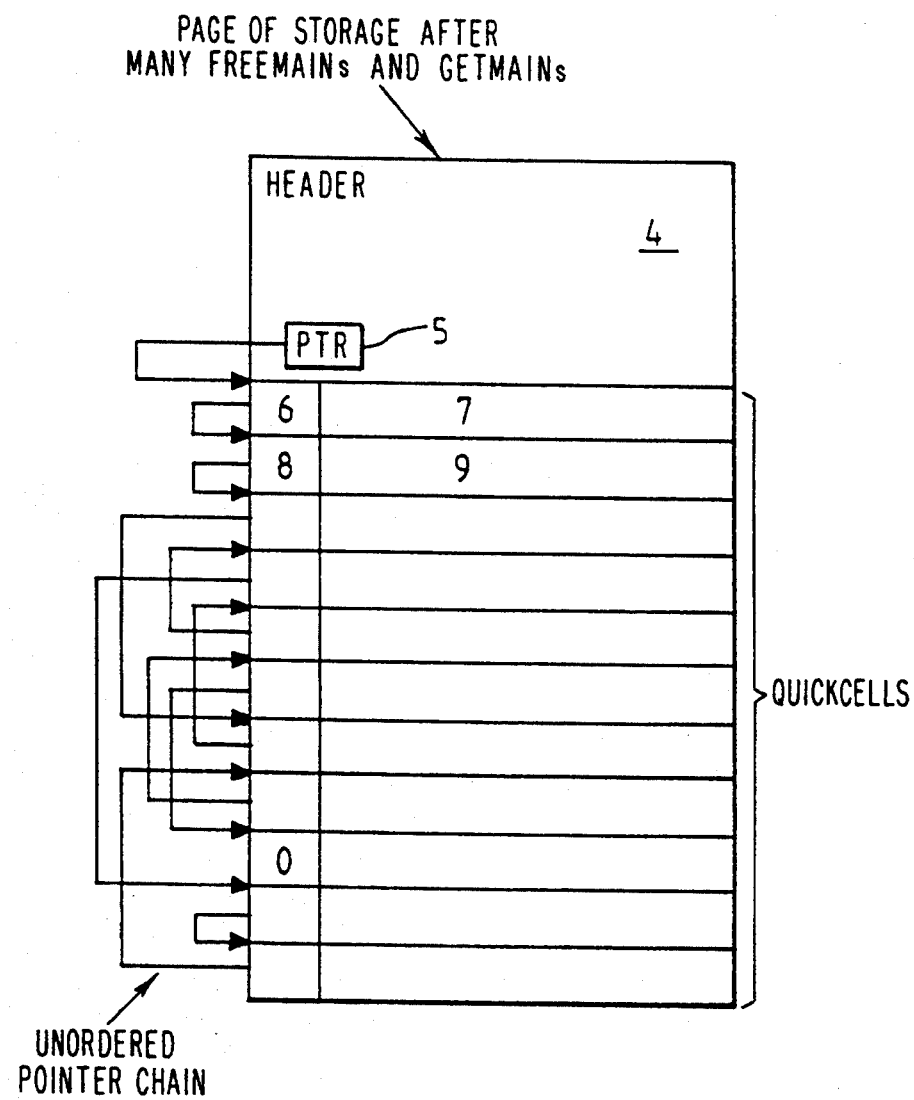
FIG. 3 is a diagram of the page of FIG. 2 after many FREEMAINs and GETMAINs have been processed.

When many FREEMAINs and GETMAINs have been issued to the same quickcell the chain of quickcells will be unordered in terms of memory addresses. FIG. 3 shows this with adjacent memory addresses being positioned in vertically adjacent boxes. This does not result in any inefficiency for a simple system, but when virtual storage and paging are used, pointers in the chain of quickcells may point to storage that has been paged out to secondary storage. This results in several instructions being used and delays occurring as information is retrieved from secondary storage.

Table 3—Quickcell Page Header (104, 204, 304) contents

Only entries relevant to the present invention are specified below although the header also contains a number of other entries.

TABLE 4

| Subpool Control Area (21) header contents | |
|---|---|
| ........ | |
| QPH_NEXT (141, 241, 341) | Pointer to next QPH |
| QPH_PREV (151, 251, 351) | Pointer to previous QPH |
| QPH_NEXT_FREE (131, 231, 331) | Pointer to next free QPH |

TABLE 4-continued

Subpool Control Area (21) header contents

| | |
|---|---|
| QPH_FIRST_FREE_CELL (161, 261, 361). | Pointer to the first free call |
| QPH_NUMBER_FREE_CELLS (367) | Number of free cells |
| QPH_SCAP (366) | Pointer to SCA owning this page |

Only entries relevant to the present invention are specified below although the header also contains a number of other entries.

| | |
|---|---|
| SCA_FIRST_QPH (41) | Pointer to first QPH |
| SCA_LAST_QPH (51) | Pointer to last QPH |
| SCA_FIRST_FREE_QPH (31) | Pointer to first free QPH |

Figure 4:
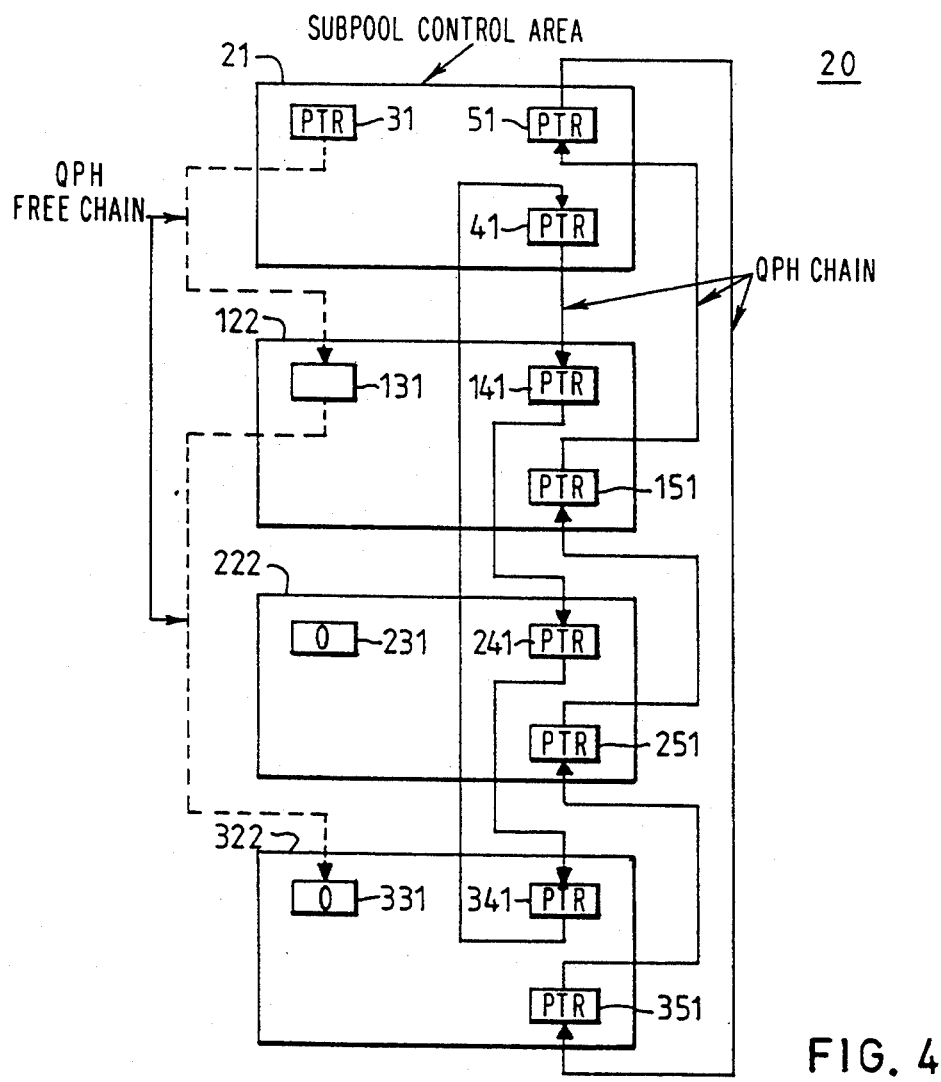
FIG. 4 is a diagram of a Quickcell Page Header (QPH) free chain and a QPH chain linking a Subpool Control Area (SCA) and the QPHs.

The QPH free chain (shown dashed) in FIG. 4 links the SCA and all the quickcell pages with free quickcells. This is a one way chain that has forward pointers only. It starts at 31 in the SCA and continues 131 through quickcell page 122 to quickcell page 322. Quickcell page 322 contains a zero value for the pointer indicating the end of the chain. Since quickcell page 222 does not contain any free quickcells, it is not included in the chain.

The QPH chain in FIG. 4 (shown continuous) links the SCA and all the quickcell pages regardless of whether they have any free quickcells. This is a two way chain that has forward and reverse pointers at each link of the chain. It starts 41 in the SCA and continues 141 through quickcell page 122, 241 through then returns to the SCA. A similar pointer 51 starts in the SCA and continues 351 through quickcell page 322, 251 through quickcell page 222 and 151 through quickcell page 122, then returns to the SCA.

Figure 5:
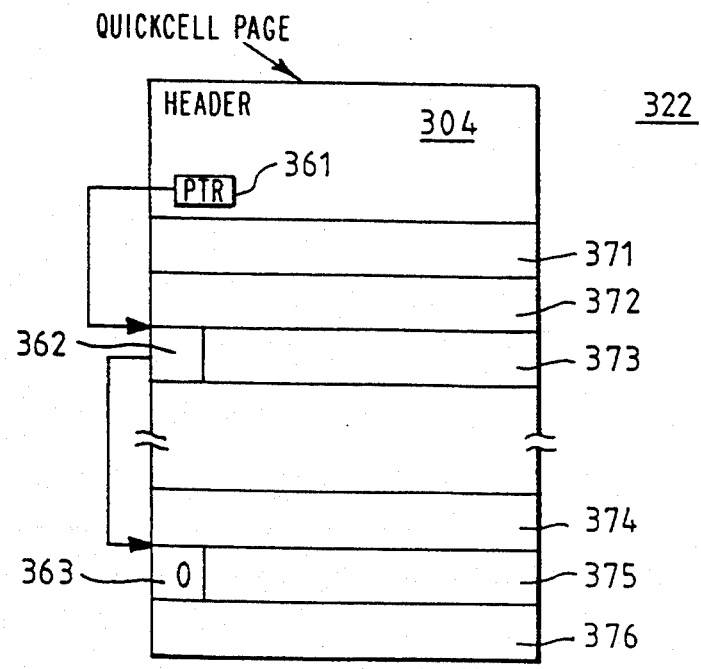
FIG. 5 is a diagram of a quickcell free chain linking a QPH and any free quickcells within a page.

Each QPH such as that shown in FIG. 5 has a chain that links all the free quickcells in that page. For quickcell page 322 this starts at 361. The last free quickcell 375 in the page has a pointer 363 with a value of zero.

Figure 6:
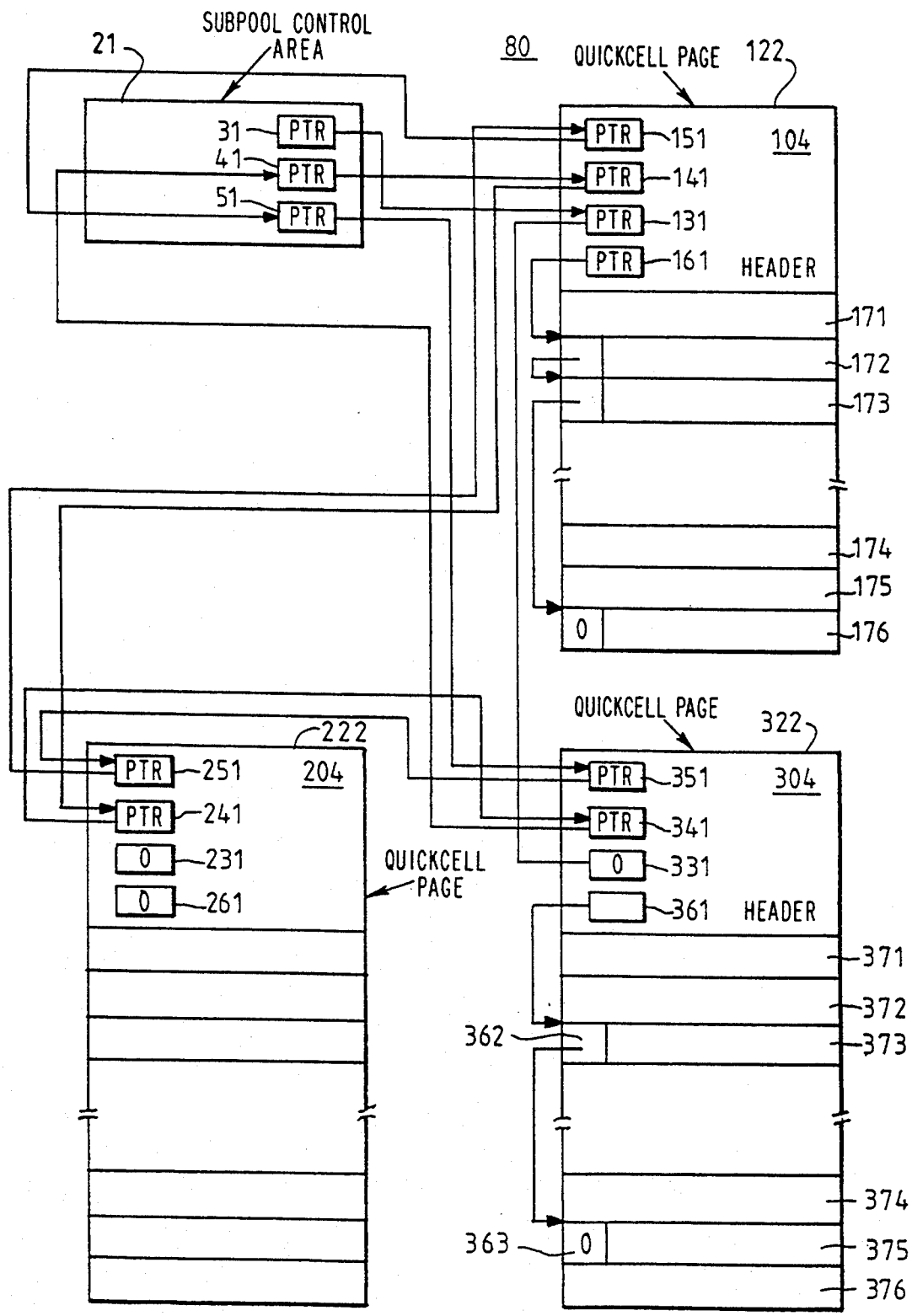
FIG. 6 is a diagram of a subpool of fixed length quickcells such as those in FIG. 2 linked by the chains of FIGS. 4 and 5.

The arrangement of FIG. 6 shows one subpool. The quickcell pages are each contained within a page of memory and each include a header 104, 204, 304. In practice, many more of such quickcell headers would be used. Hardware paging is reduced because the pointers within a quickcell page never point outside the page. The header includes pointers described in the next paragraph. The content of the header is shown in more detail in table 3.

A Subpool Control Area (SCA) 21 controls a number of quickcell pages 122, 222, 322. In practice there will also be a number of separate subpools. The SCA includes pointers 41, 51 in a two way chain through all the quickcell pages that it controls and a pointer 31 to the next quickcell page containing free quickcells. The content of the SCA is shown in more detail in table 4.

Since the quickcell pages are on page boundaries, a QPH is quickly located in memory by considering only the most significant bits of the address, the remaining bits being set to zero for the header.

The three problems mentioned with the prior art are still present in FIG. 6 but will now be described in more detail, together with the present invention which solves these three problems.

Figure 7:
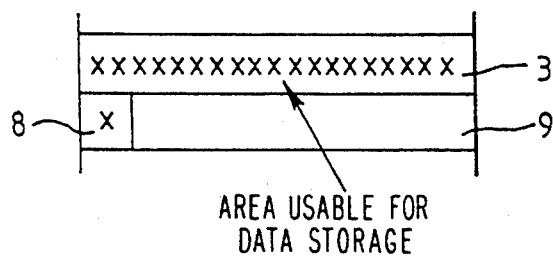
FIG. 7 is an example of a pointer being overwritten by an application.

The first problem is that an application may write data beyond the end of its allocated storage. FIG. 7 shows a pointer 8 and area 3 (introduced in FIG. 2) useable for data storage. The application which owns area 3 has written data beyond the end of the area and has corrupted the pointer 8 of the next free quickcell 9. In a similar manner the header of the next quickcell page could have been overwritten.

Figure 8:
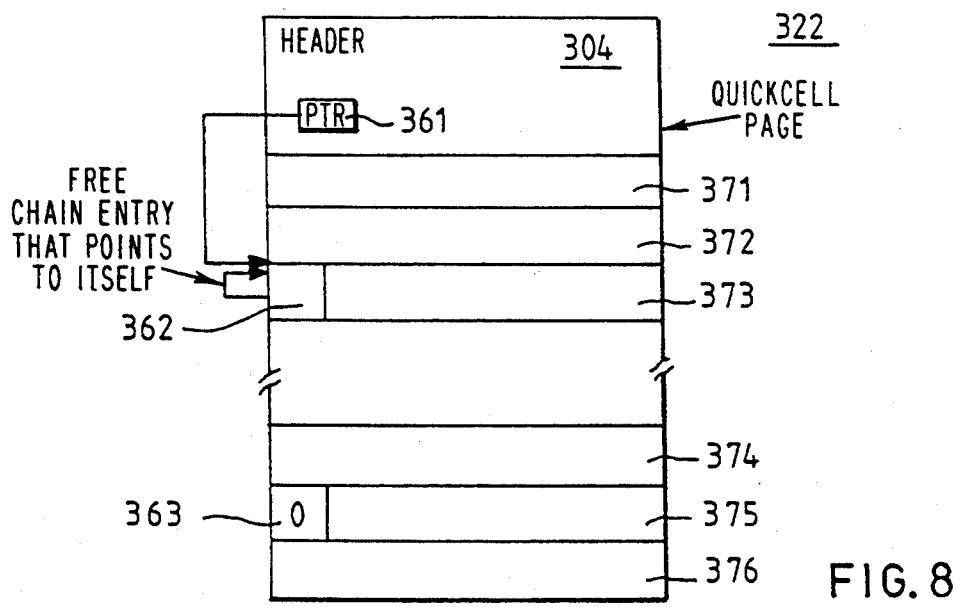
FIG. 8 is an example of a page after a "double freemain"

The second problem is that an application may issue a FREEMAIN request for storage which has already been freed. FIG. 8 shows the result of an application issuing a FREEMAIN request for storage that has been freed earlier with a FREEMAIN request and which has not since been re-allocated. The free chain now has an entry 362 that points to itself and an infinite loop can result. After a GETMAIN request allocates the quickcell to an application the quickcell will still be in the free chain, so it may be allocated to another application in response to a future GETMAIN request. Two applications may believe that they have the same storage allocated with the consequent potential corruption of data.

The third problem is that an application may supply an incorrect freemain address and the storage management system may free the storage belonging to another application.

All of the three errors described above are not detected at the time of the GETMAINs or FREEMAINs and may not be discovered until some considerable time later when it may be difficult or impossible to establish the cause.

Figure 9:
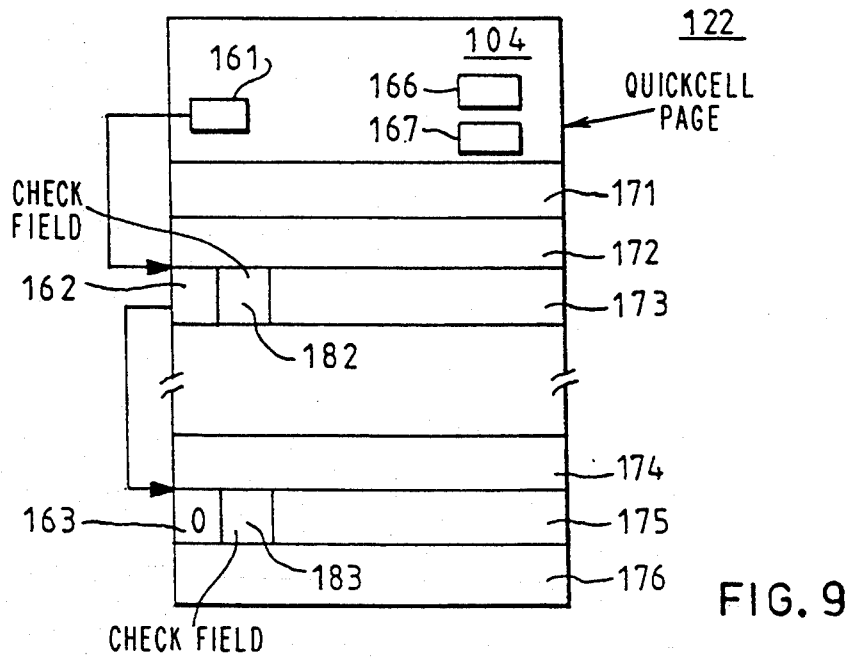
FIG. 9 is a diagram of a quickcell page of the present invention.

The solution to this is to discover the errors at the time of the FREEMAIN or GETMAIN requests. FIG. 9 shows a single quickcell page such as the one in FIG. 8, but with the addition of a check field 182, 183 at the start of the data-storing area of each quickcell. The check field contains an identifier to indicate that the storage is free. The identifier is preferably, but not necessarily, the address of the Subpool Control Area owning the storage. When the storage is allocated the check field is reset to 0 to indicate that the quickcell is no longer free. The Subpool Control Area address is obtained from the entry, QPH_SCAP, 166, 266 or 366 in the QPH and is stored in the check fields of any quickcells that are released.

Figure 10:
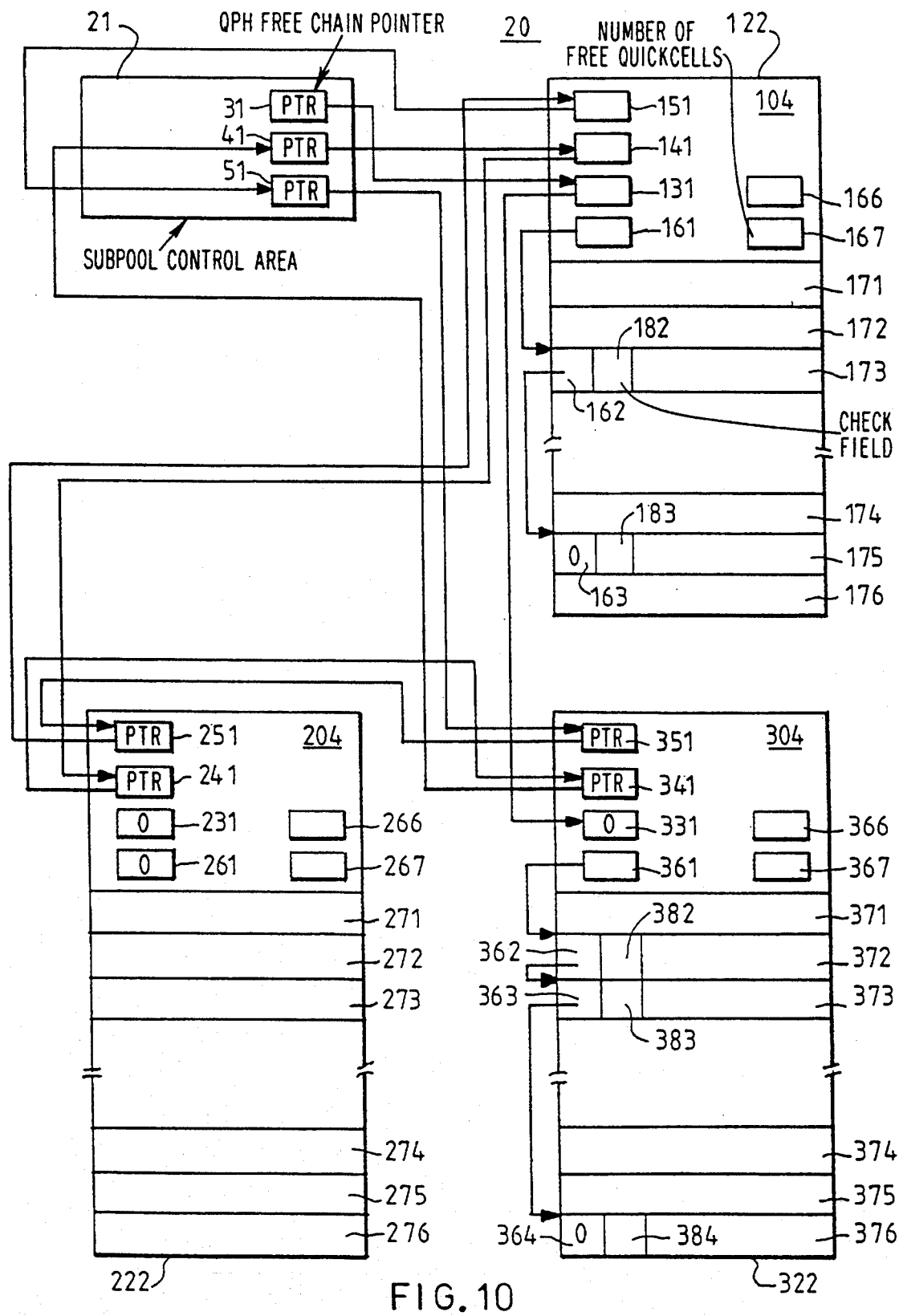
FIG. 10 is a diagram of a system of fixed length quickcells of the present invention arranged in a subpool.

When a GETMAIN request is directed to the Subpool Control Area 21 of FIG. 10 the following steps are completed.

1. The QPH free chain pointer 31 in the Subpool Control Area 21 is checked.
   If it is zero, then this subpool has no free quickcells in any quickcell pages and the GETMAIN request is returned and must be satisfied by another subpool.
   If it is non-zero, the pointer points to the header of the next quickcell page that has a free quickcell or free quickcells.

2. The free quickcell chain pointer 161 in the QPH is then used to locate the first free quickcell 173 in the page 122.

3. The second word 182 (the check field) in the free quickcell 173 is checked to see that it contains the correct data. As described above this will preferably be the address of the Subpool Control Area.
   If the first word does not contain the correct data, then either the QPH 104 or the quickcell 173 itself must have been corrupted by a storage overwrite as described above as the first problem. The quickcell is not allocated and action is taken to identify the cause of the storage overwrite. This action is to return a message to the application issuing the GETMAIN request and initiate a dump of the system to assist with debugging the problem. An alternative embodiment would attempt to restore the pointers which had been overwritten.

If the first word does contain the correct data, the quickcell is allocated by copying the contents of its pointer 162, which points to the next free quickcell 175, into the pointer 161 in the header. The pointer 162 is then reset to 0 and the check field is set to 0. The address of the quickcell is returned to the application making the GETMAIN request. When a FREEMAIN request is directed to the Subpool Control Area 21 of FIG. 10 the following steps are completed.

1. Find the QPH corresponding to the address supplied by the freemain caller. Since the quickcell pages are on page boundaries this is simply achieved by taking the more significant bits of the address, with the less significant bits set to 0.

2. Check the QPH_SCAP field 166 within the QPH. This should contain the address of the subpool 21 owning the quickcell page 122. If this is not the address of the subpool receiving the FREEMAIN request then an incorrect freemain address, described above as the third problem, has been supplied. The quickcell is not released and the requesting application is informed that an incorrect address has been supplied. It is possible, but unlikely, that an incorrect freemain address, but within the correct subpool, will be supplied. This problem is not solved by the present invention.

3. The first word in the quickcell to be freed is checked to see that it does not contain the correct data (address of the SCA) for an already free quickcell in the check field.

If the first word does not contain the address of the SCA, then the quickcell is presently allocated and has not been freed and so the FREEMAIN request continues. The address of the SCA is now put into the first word of the quickcell and the quickcell added to the quickcell free chain.

If the first word does contain the address of the SCA, then it is very likely that this is an attempt to freemain storage that has already been freemained (a "double freemain"). It is just possible that this is not a "double freemain" since the area being freemained may have a data bit pattern in the first word which is the same as the SCA address. An extra check is made by scanning the quickcell free chain 161, 162, 163 to check for a match to the freemain address. If a match is found then there has definitely been a double freemain since the quickcell is already identified as free.

If during the extra check of scanning the quickcell free chain the number 167 of free quickcells in the chain is found to be different from the value in the header, then a further potential error has been discovered and is recorded. This potential error is that the free chain may have been overwritten and corrupted.

I claim:

1. A computer data storage management system for allocating and releasing data storage memory in response to requests from application programs comprising:
    a data storage memory organized as a plurality of subpools, each subpool including a subpool control area, and a plurality of pages, each of said pages including a plurality of fixed length data storage cells, each of said data storage cells being identified by an address;
    means for creating a system of pointers including:
        a first chain of pointers linking pages having available cells; and
        within each page, a second chain of pointers linking available cells within said page, said second chain of pointers being stored as part of said data storage cells;
    means for writing in each available cell an indication that the cell is available and no storage overwrite has occurred on that cell;
    means for allocating storage, said allocating means responding to a request from a requesting application program and identifying an available storage cell via said first pointer chain and said second pointer chain and returning the address of said available storage cell to the requesting application program, wherein said allocating means checks for the presence of said indication prior to allocating a cell.

2. A system as claimed in claim 1 further including:
    means for releasing storage, said releasing means responding to a request from a requesting application program and producing an available cell by modifying said first pointer chain and said second pointer chain to include the available cell, said releasing means checking for the absence of said indication prior to the release of said available cell.

3. A system as claimed in claim 2 wherein said control area further comprises a two way chain of pointers linking said control area and all of said pages of memory.

4. A system as claimed in claim 3 wherein:
    said indication identifies one of the subpools in which the available cell is included;
    said releasing means receives the identity of the subpool; and
    said indication is verified by the releasing means against said subpool identity prior to the release of the available cell.

5. A method of allocating and releasing data storage memory in response to requests from application programs comprising the steps of:
    building a structure in data storage memory comprising a plurality of subpools, each of said subpools being arranged into a control area and a plurality of pages and each page being arranged into a plurality of fixed length data storage cells, each of said data storage cells being identified by an address;
    providing a first chain of pointers linking pages having available cells and within each page, a second chain of pointers linking available cells within said page, said second chain of pointers being provided within said data storage cells;
    providing an indication in each available cell that the cell is available and no storage overwrite has occurred on that cell;
    allocating a storage cell to a requesting application program by identifying an available storage cell via said first pointer chain and said second pointer chain and returning the address of said available storage cell to the requesting application program, said identification including checking for the presence of said indication prior to allocation of a cell.

6. A method as claimed in claim 5 further including the steps of releasing a storage cell in response to a request from an application program, said release producing an available cell by modifying said first pointer chain and said second pointer chain to include the available cell and checking for the absence of said indication prior to the release of said available cell.

* * * * *